(12) United States Patent
Lee et al.

(10) Patent No.: US 12,006,117 B2
(45) Date of Patent: Jun. 11, 2024

(54) CONTAINER

(71) Applicant: YONWOO CO., LTD., Incheon (KR)

(72) Inventors: Chang Soo Lee, Sejong-si (KR); Sang In Han, Sejong-si (KR); Hye Jin Jung, Sejong-si (KR); Hee Yoon Kim, Sejong-si (KR)

(73) Assignee: YONWOO CO., LTD., Incheon (KR)

( * ) Notice: Subject to any disclaimer, the term of this patent is extended or adjusted under 35 U.S.C. 154(b) by 232 days.

(21) Appl. No.: 17/605,930

(22) PCT Filed: Jul. 8, 2021

(86) PCT No.: PCT/KR2021/008694
§ 371 (c)(1),
(2) Date: Oct. 22, 2021

(87) PCT Pub. No.: WO2022/186430
PCT Pub. Date: Sep. 9, 2022

(65) Prior Publication Data
US 2022/0281663 A1    Sep. 8, 2022

(51) Int. Cl.
*B65D 75/26* (2006.01)
*B32B 7/12* (2006.01)
(Continued)

(52) U.S. Cl.
CPC ............... *B65D 75/26* (2013.01); *B32B 7/12* (2013.01); *B32B 27/10* (2013.01); *B32B 27/32* (2013.01);
(Continued)

(58) Field of Classification Search
CPC ...... B65D 75/26; B65D 75/58; B65D 65/466; B65D 75/5827; B65D 75/5883; B32B 7/12; B32B 27/10; B32B 27/32; B32B 2255/10; B32B 2255/26; B32B 2307/4023; B32B 2307/2307; B32B 2307/7163; B32B 2307/7265; B32B 2439/49; B32B 27/08;
(Continued)

(56) References Cited

U.S. PATENT DOCUMENTS 2,734,665 A    2/1956   Flamm
4,543,139 A *  9/1985   Freedman ................... C09J 7/10
                                                            156/247
(Continued)

FOREIGN PATENT DOCUMENTS

CN          1498184 A      5/2004
CN        104999757 A     10/2015
(Continued)

*Primary Examiner* — Ishal Pancholi
(74) *Attorney, Agent, or Firm* — Bridgeway IP Law Group, PLLC; Sang Ho Lee; Hyun Woo Shin (57) ABSTRACT

Provided is a container including a container portion configured to form a storage space in which contents are stored, a head portion disposed at an upper side of the container portion and configured to promote discharge of the contents, which enter the head portion from the container portion, through an internal pressure change caused by a pressing portion which is formed at one side of the head portion and made of an elastic material, and a nozzle configured to discharge the contents, which enter the nozzle from the head portion, in fixed amounts.

14 Claims, 10 Drawing Sheets

(51) Int. Cl.
*B32B 27/10* (2006.01)
*B32B 27/32* (2006.01)
*B65D 65/46* (2006.01)
*B65D 75/58* (2006.01)

(52) U.S. Cl.
CPC ....... *B65D 65/466* (2013.01); *B65D 75/5827* (2013.01); *B65D 75/5883* (2013.01); *B32B 2255/10* (2013.01); *B32B 2255/26* (2013.01); *B32B 2307/4023* (2013.01); *B32B 2307/7163* (2013.01); *B32B 2307/7265* (2013.01); *B32B 2439/46* (2013.01)

(58) Field of Classification Search
CPC . B32B 2307/558; B32B 7/06; B32B 2255/12; B32B 2307/748; B32B 27/302; B32B 27/36
USPC .......................................................... 222/92
See application file for complete search history.

(56) References Cited

U.S. PATENT DOCUMENTS

| | | | |
|---|---|---|---|
| 4,806,398 A * | 2/1989 | Martin, Jr. | B32B 27/36 156/244.11 |
| 5,230,944 A * | 7/1993 | Beer | B32B 27/306 428/41.5 |
| 2007/0073231 A1 | 3/2007 | Lee et al. | |
| 2007/0211967 A1* | 9/2007 | Murray | B65B 3/045 383/207 |
| 2017/0320641 A1 | 11/2017 | Geiger et al. | |
| 2018/0147814 A1* | 5/2018 | Sato | B32B 3/08 |
| 2018/0360415 A1* | 12/2018 | Dohm | A61B 8/4281 |
| 2022/0281666 A1* | 9/2022 | Lee | B65D 75/5866 |

FOREIGN PATENT DOCUMENTS

| | | |
|---|---|---|
| CN | 107757031 A | 3/2018 |
| CN | 110551474 A | 12/2019 |
| JP | 36-015492 Y | 6/1950 |
| JP | 05-57847 A | 3/1993 |
| JP | 05-220886 A | 8/1993 |
| JP | 11-514595 A | 12/1999 |
| JP | 2000-302153 A | 10/2000 |
| JP | 2003-081285 A | 3/2003 |
| JP | 2006-082847 A | 3/2006 |
| JP | 2006-225021 A | 8/2006 |
| JP | 2007-276194 A | 10/2007 |
| JP | 2013-244990 A | 12/2013 |
| JP | 2017-504379 A | 2/2017 |
| JP | 2018-144493 A | 9/2018 |
| JP | 2019-137067 A | 8/2019 |
| KR | 20-0310084 Y1 | 4/2003 |
| KR | 20-2010-0000265 U | 1/2010 |
| KR | 10-1258401 B1 | 4/2013 |
| KR | 10-2014-0026694 A | 3/2014 |
| KR | 10-2015-0067412 A | 6/2015 |
| KR | 10-1969461 B1 | 4/2019 |
| KR | 10-2019-0136147 A | 12/2019 |
| KR | 10-2020-0020310 A | 2/2020 |
| KR | 10-2076658 B1 | 2/2020 |
| KR | 1020200020310 * | 2/2020 |
| KR | 10-2141711 B1 | 8/2020 |
| KR | 102141711 B1 * | 8/2020 |
| KR | 10-2279627 B1 | 7/2021 |
| TW | 1671374 B | 9/2019 |
| WO | 2017/146373 A | 8/2017 |

* cited by examiner

CONTAINER

TECHNICAL FIELD

The present invention relates to a container, and more particularly, to a container using an eco-friendly material and capable of discharging contents in fixed amounts.

BACKGROUND ART

With the economic development and the growing design awareness of consumers, cosmetic products have emerged as an essential consumption item that not only provides skin protection and lightening functions to consumers but also satisfies the aesthetic needs of consumers.

Generally, cosmetic products are sold in glass bottles or containers molded from plastic. Such glass bottles or containers made of plastic have a problem in that it is difficult to use the cosmetic product remaining at the bottom of the container. Further, such cosmetic containers have a problem of being difficult to reuse, thus causing environmental pollution.

Also, in order to prevent wasting of cosmetic products and prevent excessive skin irritation, there is a need to use a cosmetic product in a fixed amount every time. However, in the case of conventional cosmetic containers, it is difficult to control the amount of liquid contents being discharged every time, and thus there is a problem of having difficulty in using a cosmetic product in a fixed amount every time.

DISCLOSURE

Technical Problem

The present invention is directed to providing a container using an eco-friendly material and capable of discharging contents in fixed amounts.

The technical objectives of the present invention are not limited to the above objective, and other objectives may become apparent to those of ordinary skill in the art from the following description.

Technical Solution

An embodiment of the present invention provides a container. The container includes a container portion configured to form a storage space in which contents are stored, a head portion disposed at an upper side of the container portion and configured to promote discharge of the contents, which enter the head portion from the container portion, through an internal pressure change caused by a pressing portion which is formed at one side of the head portion and made of an elastic material, and a nozzle configured to discharge the contents, which enter the nozzle from the head portion, in fixed amounts.

The nozzle may be formed to extend upward from the head portion and may decrease a flow velocity of the contents, which enter from the head portion, in stages to discharge the contents in fixed amounts.

The nozzle may include a nozzle tube in which the contents move after entering from the head portion through an inlet and in which a nozzle throat, where an inner diameter decreases and then increases, is formed in one area and a nozzle head which is disposed at an upper end of the nozzle tube and in which an outlet is formed at an upper side, wherein a movement speed of the contents may decrease as the contents pass through the nozzle throat, and the contents may be filled inside the nozzle head and then discharged.

The head portion may include a body portion which has the pressing portion formed at a side surface and has an upper side coupled to the nozzle, a guide portion which is disposed at an upper end of the body portion and allows the contents in the head portion to head toward the nozzle through a communication hole, and a valve disposed in the guide portion to open or close the communication hole.

The guide portion may include a seating portion which has a catching protrusion formed along a periphery so as to be seated on the upper end of the body portion, an extending portion inserted into the body portion, and a base portion which is configured to connect a lower end of the extending portion and has the communication hole formed in one area thereof, wherein the valve may be disposed inside the extending portion and the base portion.

The container portion may be a pouch which is formed due to bonding of peripheries of one or more packaging sheets, and the packaging sheet may include a paper layer, a first film layer disposed at a lower side of the paper layer to prevent absorption of the contents into the paper layer, and a second film layer disposed between the paper layer and the first film layer to improve the strength of the packaging sheet.

The second film layer may be formed to be deposited on one surface of the first film layer.

A material of the second film layer may include at least one of polyethylene terephthalate (PET), glycol-modified polyethylene terephthalate (PETG), post-consumer recycled polyethylene terephthalate (PCR-PET), polyethylene, polypropylene (PP), polyester (PE), polymethyl methacrylate (PMMA), and a styrene-acrylonitrile copolymer (SAN).

The packaging sheet may further include an adhesive layer configured to adhere the second film layer and the paper layer to each other between the second film layer and the paper layer, and the adhesive layer may be formed of a water-degradable adhesive, and due to the water degradation of the adhesive layer, the paper layer may be separated from the first film layer and the second film layer.

The container may further include a spout which is coupled to the container portion so as to be able to communicate therewith and has a contents movement path formed therein to allow the contents to enter and be discharged, a tear-off portion may be formed in the container portion as one area thereof is drawn inward, and by tearing off the container portion along the tear-off portion, at least a portion of the container portion may be separated from the spout.

An embodiment of the present invention provides a container set. The set includes a plurality of refill containers and an applicator. The refill container may include a container portion configured to form a storage space in which contents are stored, a spout which is coupled to the container portion so as to be able to communicate therewith and has a contents movement path formed therein to allow the contents to enter and be discharged, and a stopper detachably coupled to the spout to seal the spout. The applicator may include a head portion having a pressing portion made of an elastic material formed at one side and a nozzle coupled to the head portion to discharge the contents in fixed amounts. The head portion of the applicator may be detachably coupled to the spout to allow the plurality of refill containers to be replaceably used with respect to the applicator.

An embodiment of the present invention provides a packaging sheet. The packaging sheet may include a paper layer, a first film layer disposed at a lower side of the paper layer to prevent absorption of the contents into the paper layer, and a second film layer disposed between the paper layer and the first film layer to improve the strength of the packaging sheet.

The packaging sheet may be provided as one or more packaging sheets, and peripheries of the one or more packaging sheets may be bonded to form a pouch.

The second film layer may be formed to be deposited on one surface of the first film layer.

The packaging sheet may further include an adhesive layer configured to adhere the second film layer and the paper layer to each other between the second film layer and the paper layer, and the adhesive layer may be formed of a water-degradable adhesive, and due to the water degradation of the adhesive layer, the paper layer may be separated from the first film layer and the second film layer.

An embodiment of the present invention provides a nozzle. The nozzle may decrease a flow velocity of the contents, which move inside the nozzle, in stages to discharge the contents in fixed amounts.

The nozzle may include a nozzle tube in which the contents move after entering through an inlet and in which a nozzle throat, where an inner diameter decreases and then increases, is formed in one area and a nozzle head which is disposed at an upper end of the nozzle tube and in which an outlet is formed at an upper side.

A movement speed of the contents may decrease as the contents pass through the nozzle throat, and the contents may be filled inside the nozzle head and then discharged.

An embodiment of the present invention provides a container. The container includes a container portion configured to form a storage space in which contents are stored, a spout coupled to the container portion and through which the contents in the container portion are discharged, and a nozzle configured to discharge the contents, which enter from the spout, in fixed amounts, wherein the spout and the nozzle may be integrally formed.

The nozzle may decrease a flow velocity of the contents, which enter from the spout, in stages to discharge the contents in fixed amounts.

The nozzle may include a nozzle tube in which the contents move after entering from the spout through an inlet and in which a nozzle throat, where an inner diameter decreases and then increases, is formed in one area and a nozzle head which is disposed at an upper end of the nozzle tube and in which an outlet is formed at an upper side, wherein a movement speed of the contents may decrease as the contents pass through the nozzle throat, and the contents may be filled inside the nozzle head and then discharged.

The container portion may be a pouch which is formed due to bonding of peripheries of one or more packaging sheets, and the packaging sheet may include a paper layer, a first film layer disposed at a lower side of the paper layer to prevent absorption of the contents into the paper layer, and a second film layer disposed between the paper layer and the first film layer to improve the strength of the packaging sheet.

The second film layer may be formed to be deposited on one surface of the first film layer.

The packaging sheet may further include an adhesive layer configured to adhere the second film layer and the paper layer to each other between the second film layer and the paper layer, and the adhesive layer may be formed of a water-degradable adhesive, and due to the water degradation of the adhesive layer, the paper layer may be separated from the first film layer and the second film layer.

A tear-off portion may be formed in the container portion as one area thereof is drawn inward, and by tearing off the container portion along the tear-off portion, at least a portion of the container portion may be separated from the spout.

Advantageous Effects

According to the present invention, a packaging sheet has a paper layer as a base and can provide excellent blocking performance without using a layer made of a metal such as aluminium.

Also, according to the present invention, in the packaging sheet, the paper layer and a film layer can be easily separated from each other through water degradation.

Also, according to the present invention, a container is made of an eco-friendly material to reduce environmental pollution and is manufactured in the form of a pouch to facilitate withdrawal of contents.

Also, according to the present invention, contents can be discharged in fixed amounts in the form of drops through a nozzle, and a discharge speed can be controlled by pressure.

Also, according to the present invention, a flow velocity of contents being discharged is gradually decreased to prevent a case in which a large amount of fluid is discharged at one time or the contents are not discharged in the form of drops.

DESCRIPTION OF DRAWINGS

A brief description of each drawing will be provided for better understanding of the drawings referenced in the detailed description of the present invention.

MODES OF THE INVENTION

Hereinafter, exemplary embodiments according to the present invention will be described in detail with reference to the accompanying drawings. The same reference numeral or symbol throughout the drawings indicates a component or element that performs substantially the same function. For convenience of description, directions such as vertical and horizontal mentioned herein are based on the drawings, and the scope of the present invention is not necessarily limited by the corresponding directions.

Terms including ordinals such as first and second may be used to describe various elements, but the elements are not limited by the terms. The terms are only used for the purpose of distinguishing one element from another element. For example, without departing from the scope of the present invention, a first element may be referred to as a second element, and likewise, a second element may also be referred to as a first element. The term and/or includes a combination of a plurality of related items or any one item among the plurality of related items.

Terms used herein are used to describe embodiments and are not intended to limit and/or restrict the present invention. A singular expression includes a plural expression unless the context clearly indicates otherwise. In the specification, terms such as "include" or "have" should be understood as specifying that features, number, steps, operations, elements, components, or combinations thereof are present and not as precluding the possibility of the presence or addition of one or more other features, numbers, steps, operations, elements, components, or combinations thereof in advance.

Throughout the specification, when a certain part is described as being connected to another part, this not only includes a case in which the certain part is directly connected to the other part but also includes a case in which the certain part is electrically connected to the other part while another device is disposed therebetween. Also, when a certain part is described as including a certain element, this signifies that the certain part may further include another element rather than excluding the other element unless particularly described otherwise.

Figure 1:
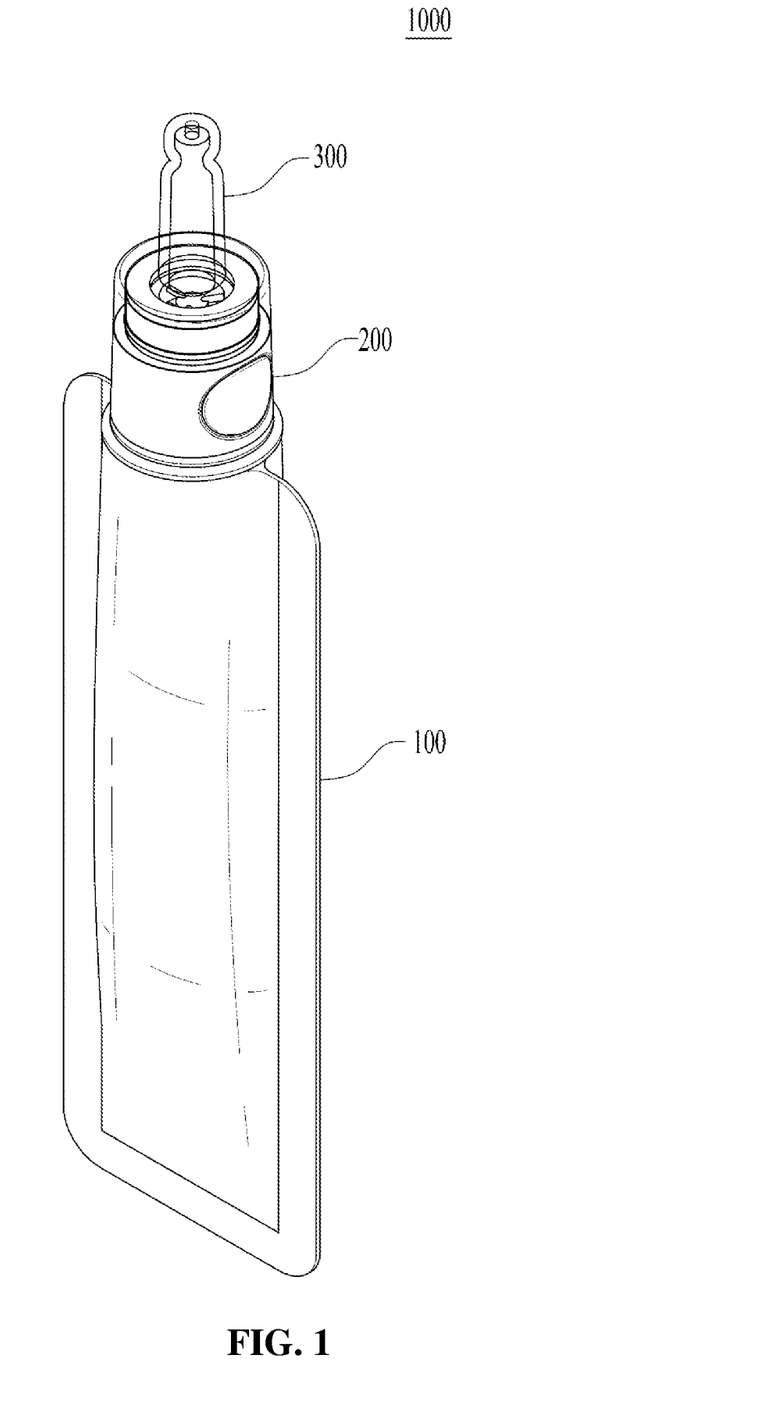
FIG. 1 is a perspective view of a container according to an embodiment of the present invention.
Figure 2:
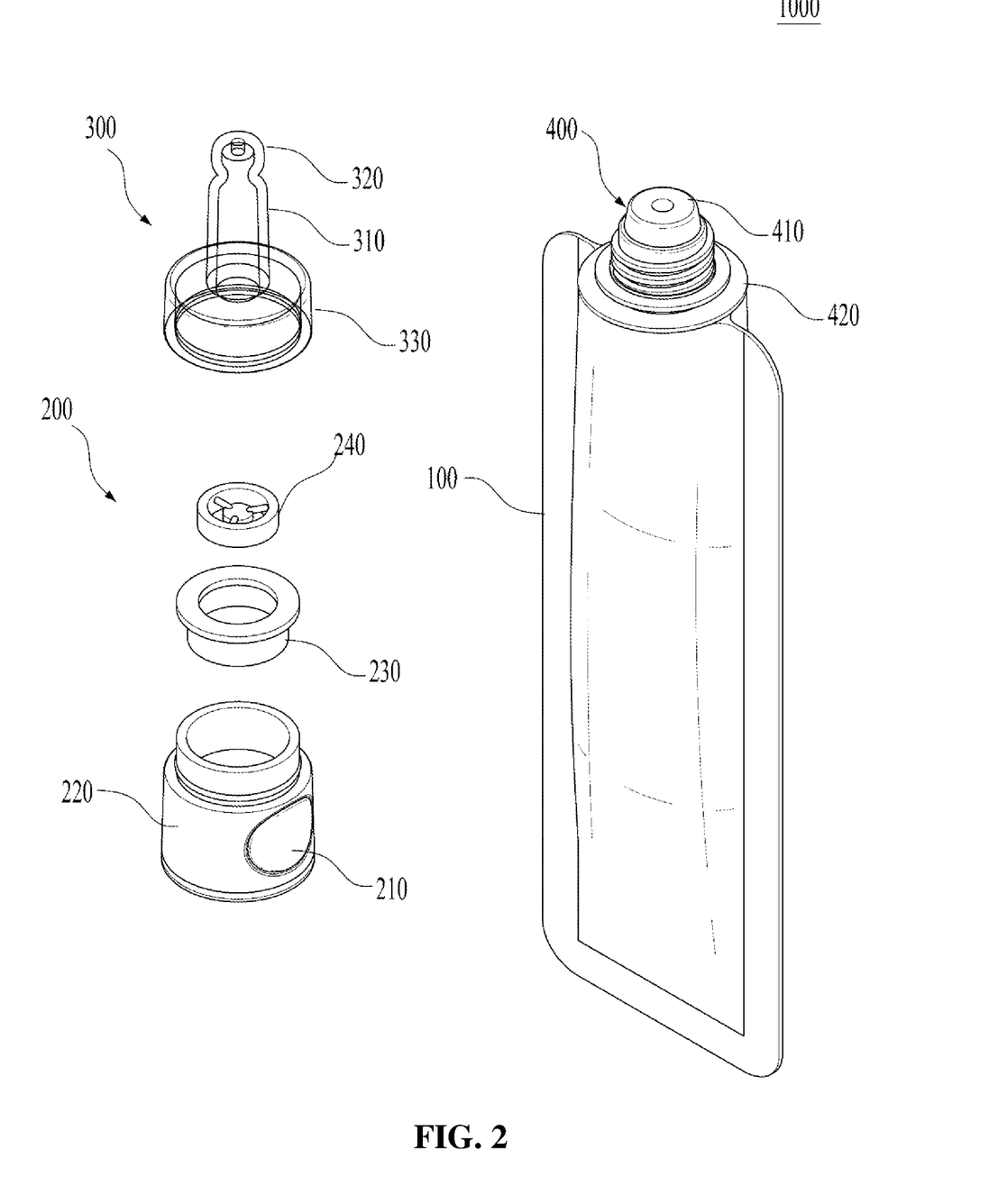
FIG. 2 is an exploded view of the container according to the embodiment of the present invention.
Figure 3:
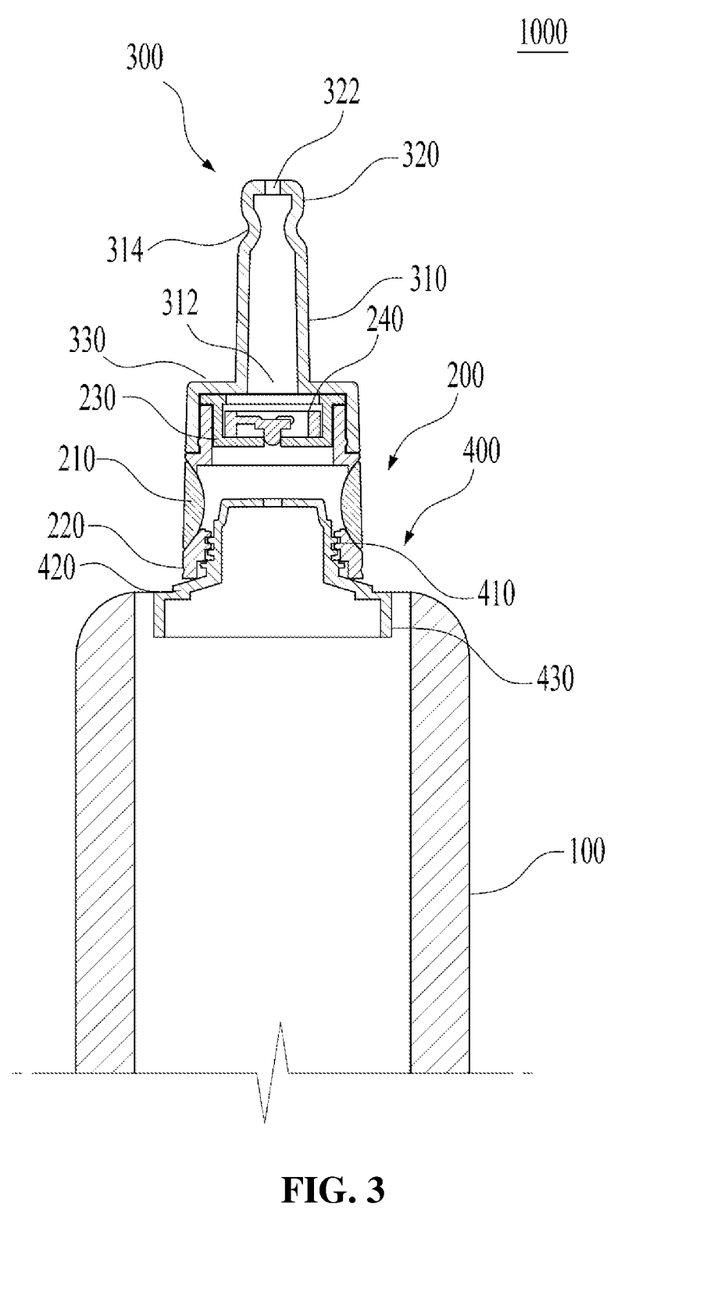
FIG. 3 is a cross-sectional view of the container according to the embodiment of the present invention.

FIG. 1 is a perspective view of a container according to an embodiment of the present invention, FIG. 2 is an exploded view of the container according to the embodiment of the present invention, and FIG. 3 is a cross-sectional view of the container according to the embodiment of the present invention.

Referring to FIGS. 1 to 3, a container 1000 may include a container portion 100, a head portion 200, a nozzle 300, and a spout 400.

The container portion 100 may be made of packaging sheets, and peripheries of at least some packaging sheets may be bonded to each other to form a storage space in which contents are stored. For example, a front packaging sheet and a rear packaging sheet may be bonded to each other along peripheries thereof to form the container portion 100, and a storage space configured to accommodate contents may be formed inside the container portion 100. Here, the container portion 100 may be referred to as a pouch, but the present invention is not limited thereto.

In an embodiment, the contents stored in the container portion 100 may be a cosmetic material in a liquid, gel, or powder form. Examples of the contents may include a lotion, a milk lotion, a moisturizing lotion, a nourishing lotion, a skin lotion, a skin softener, a skin toner, an astringent, a massage cream, a nourishing cream, a moisturizing cream, a skin lightening essence, a tone up cream, a liquid sunscreen, sunblock, sun milk, a blemish balm (BB) cream, a base, a foundation, a color correcting (CC) cream, concealer, blusher, contour powder, an eye cream, a primer, and the like. However, the contents are not limited thereto, and other forms or types of cosmetic materials, medical materials, or the like may be applied as the contents.

In an embodiment, an area where the front packaging sheet and the rear packaging sheet are bonded to each other may form a sealing portion. The sealing portion may have improved strength, durability, and sealability as compared to other areas of the packaging sheets. Therefore, due to the sealing portion, leakage of the contents to the outside may be prevented, and the shape of the container portion 100 may be maintained. Here, in bonding to form the sealing portion, various bonding techniques such as chemical bonding using an adhesive, internal-heat bonding (ultrasonic bonding, high-frequency bonding, or the like), and external-heat bonding may be applied.

In an embodiment, the front packaging sheet and the rear packaging sheet are separate sheets and may be combined with each other through bonding. However, this is only illustrative, and various other configurations may be applied according to an embodiment. For example, the front packaging sheet and the rear packaging sheet may constitute an integrated packaging sheet and may be combined through bonding in a state in which at least some areas are in contact with each other by folding and/or rolling.

According to an embodiment, a tear-off portion 110 may be formed in the container portion 100. The tear-off portion 110 is for facilitating the tearing of the container portion 100 and may be formed as one area of the container portion 100 is drawn inward.

The head portion 200 may be disposed at an upper side of the container portion 100 and may discharge the contents, which enter the head portion 200 from the container portion 100, to the nozzle 300.

In an embodiment, the head portion 200 may be formed to have upper and lower portions that communicate with each other, and an accommodation space may be formed in the head portion 200 to allow the contents to be temporarily accommodated therein and then discharged to the nozzle 300.

In an embodiment, a pressing portion 210 may be formed on one surface of the head portion 200. The pressing portion 210 may be made of an elastic material and may be elastically deformed inward when an external force is applied thereto. Due to the deformation, the pressure inside the head portion 200 increases. Thus, the contents in the head portion 200 may be moved to the nozzle 300 and/or such movement may be promoted. In order to facilitate holding and using the head portion 200, the pressing portion 210 may be formed on a side surface of the head portion 200. However, the present invention is not limited thereto, and according to an embodiment, the head portion 200 may not include the pressing portion 210.

In an embodiment, the head portion 200 may include a body portion 220 and a guide portion 230. The body portion 220 may be vertically passed through, may form the accommodation space therein, and may have the pressing portion 210 formed on a side surface thereof. Also, the guide portion 230 may be disposed at an upper end of the body portion 220 to allow the contents to head toward the nozzle 300 through a communication hole formed in the guide portion 230. According to an embodiment, the guide portion 230 and the body portion 220 may be integrally formed or may be separately formed and then assembled.

In an embodiment, the communication hole of the guide portion 230 may be formed to have a narrow inner diameter. For example, the communication hole may be formed to be narrower than an inner diameter of the head portion 200. Since the contents in the head portion 200 are discharged through the communication hole having a narrow inner diameter, a case in which a large amount of contents enter the nozzle 300 at one time may be prevented.

In an embodiment, the guide portion 230 may include a seating portion which has a catching protrusion formed along a periphery so as to be seated on the upper end of the body portion 220, an extending portion inserted into the body portion 220, and a base portion which is configured to connect a lower end of the extending portion and has the communication hole formed in one area thereof. Here, the extending portion may come in close contact with an inner side surface of the body portion 220 to stably fix the guide portion 230 and may prevent leakage of the contents along a boundary between the body portion 220 and the guide portion 230. However, the present invention is not limited thereto.

In an embodiment, the head portion 200 may further include a valve 240 configured to open or close the communication hole of the guide portion 230. Specifically, the valve 240 may seal the communication hole, and in a case in which the pressure inside the head portion 200 changes due to the pressing portion 210, the valve 240 may open the communication hole to allow the contents to head toward the nozzle 300. For example, the valve 240 may be a check valve 240 that is disposed in the guide portion 230. However, the present invention is not limited thereto.

In an embodiment, the valve 240 may include a support portion disposed inside the guide portion 230 in close contact therewith, an opening/closing protrusion configured to move up and down according to a pressure change in the head portion 200 to open or close the communication hole of the guide portion 230, and at least one bridge configured to connect the support portion and the opening/closing protrusion to each other.

The nozzle 300 may be formed above the head portion 200 and may discharge the contents that enter the nozzle 300 from the head portion 200.

In an embodiment, a flow velocity of the contents may be decreased as the contents pass through the nozzle 300. The contents with decreased velocity may be discharged in the form of drops. According to an embodiment, a change in pressure inside the head portion 200 due to the pressing portion 210 may promote discharge of the contents.

In an embodiment, an inner diameter of the nozzle 300 may be formed to be narrow so that, due to surface tension, the contents are not easily discharged to the outside of the nozzle 300. Also, the contents may be filled in an upper end portion (or a nozzle head 320) of the nozzle 300 and then discharged. To this end, an inner diameter of an outlet 322 of the nozzle 300 may be formed to be narrower than an inner diameter of other areas (for example, a nozzle tube 310, the nozzle head 320) of the nozzle 300. However, the present invention is not limited thereto.

In an embodiment, the nozzle 300 may include the nozzle tube 310 in which the contents move after entering from the head portion 200 through an inlet 312 and in which a nozzle throat 314, where an inner diameter decreases and then increases, is formed in one area and the nozzle head 320 which is continuous with the nozzle tube 310 and has the outlet 322 formed at an upper end portion.

In an embodiment, the nozzle throat 314 may include a convergent section in which an inner diameter gradually decreases upward and a divergent section which is continuous with the convergent section and in which an inner diameter gradually increases upward. A flow velocity of the contents passing through the nozzle tube 310 may firstly decrease due to the bottleneck phenomenon as the contents pass through the convergent section of the nozzle throat 314. Also, the flow velocity of the contents may secondarily decrease as the contents enter the divergent section. In this way, since the flow velocity of the contents moving along the nozzle tube 310 decreases in stages due to the nozzle throat 314, the contents may be prevented from being sprayed at high speed (even when pressure is applied).

In an embodiment, the nozzle head 320 may be formed at an upper end of the nozzle tube 310 so as to surround the contents moving from the nozzle tube 310 and may have the outlet 322 formed at the upper end portion. The contents that have passed through the nozzle tube 310, particularly, the nozzle throat 314, move to the nozzle head 320. Here, since a flow velocity of the contents is very low, an influence of surface tension may significantly increase. In addition, since the nozzle head 320 is formed to surround the contents, the contents may be filled in the nozzle head 320 instead of being immediately discharged through the outlet 322. Then, the contents may be discharged in the form of drops through the outlet 322. Here, for example, an inner diameter of the outlet 322 may be formed to be narrower than an inner diameter of the nozzle throat 314 to facilitate formation of drops of the contents.

In an embodiment, after the movement speed of the contents discharged to the nozzle 300 decreases in stages as the contents pass through the nozzle tube 310, the contents may collide with the nozzle head 320 and stop moving. Due to surface tension, the contents in the nozzle head 320 are difficult to be smoothly discharged. Accordingly, the contents that have passed through the nozzle throat 314 may be gradually filled in the nozzle head 320. As a force applied to the filled contents, e.g., the gravity or the like, exceeds the surface tension on the contents at the outlet 322, the contents may be gradually discharged from the outlet 322. Here, due to surface tension, the contents may agglomerate into spherical shapes and may be formed in the form of drops on an outer side of the outlet 322. Then, as the contents are gradually discharged from the outlet 322, the size of the drops may gradually increase, and in a case in which the size of the drops increases to a predetermined size or more, the drops may be separated from the outlet 322 and fall. Here, since the size of the drops, which are separated from the outlet 322 and fall, are always the same, the contents may be discharged in fixed amounts, and a user may control the number of falling drops to precisely control the use amount of the contents.

In an embodiment, when the user presses the pressing portion 210, the pressure inside the head portion 200 increases, and a speed at which the nozzle 300 is filled with the contents is increased. Thus, discharge of the contents from the outlet 322 may be promoted.

In an embodiment, the nozzle 300 may further include a nozzle coupling portion 330 which is formed at a lower side of the nozzle tube 310 and configured to be coupled to the head portion 200. The nozzle coupling portion 330 may include an upper wall configured to cover an upper end of the head portion 200 and a sidewall which extends downward along the periphery of the upper wall and is configured to be coupled to a side surface of the head portion 200. Due to the nozzle coupling portion 330, the nozzle 300 may be easily coupled to the head portion 200, and particularly, when coupling the nozzle coupling portion 330 and the head portion 200 to each other, the guide portion 230 seated in the body portion 220 may be fitted and fixed by the body portion 220 and the nozzle coupling portion 330. However, the present invention is not limited thereto.

In an embodiment, the nozzle tube 310, the nozzle head 320, and the nozzle coupling portion 330 may be integrally formed. Also, at least some of the nozzle tube 310, the nozzle head 320, and the nozzle coupling portion 330 may be made of a transparent material or a semitransparent material. However, the present invention is not limited thereto.

The spout 400 may be coupled to the container portion 100 and communicate with the accommodation space of the container portion 100. Also, the spout 400 may be coupled to the head portion 200 to allow the contents entering the spout 400 from the container portion 100 to move to the head portion 200. According to an embodiment, the spout 400 may be integrally formed with the head portion 200 and/or the nozzle 300 or may be separately formed and then assembled thereto.

In an embodiment, the spout 400 may include a discharge portion 410, a pedestal portion 420, and a bonding portion 430.

In an embodiment, the discharge portion 410 may have a contents movement path formed therein to be passed through and may have a coupling portion formed at an outer side thereof for coupling to the head portion 200. A lower side of the contents movement path of the discharge portion 410 may communicate with the storage space of the container portion 100 to allow the contents to enter the discharge portion 410, and the contents may move along the contents movement path and be discharged to an upper side of the contents movement path.

In an embodiment, the pedestal portion 420 may extend outward from a lower side of the coupling portion and may be formed as a flat plate having a circular, elliptical, or polygonal shape. When the head portion 200 is coupled to the discharge portion 410, the pedestal portion 420 may support a lower end of the head portion 200 to allow the head portion 200 to be more stably coupled to the spout 400. Also, the pedestal portion 420 may allow an upper portion of the container portion 100 to be supported by a bottom surface of the pedestal portion 420 to, for example, prevent a case in which the spout 400 moves into the container portion 100 or, conversely, the container portion 100 moves to an upper side (for example, the discharge portion 410 or the like) of the spout 400. Also, when coupling the container portion 100 and the spout 400 to each other, the pedestal portion 420 may allow an upper end of the container portion 100 to come in contact with the bottom surface of the pedestal portion 420 to guide a position of the container portion 100. According to an embodiment, in a case in which a stopper (a stopper 500 of FIGS. 7 and 8) is coupled to the spout 400, the pedestal portion 420 may support a lower end of the stopper.

In an embodiment, the bonding portion 430 may be formed to have a predetermined volume at a lower side of the pedestal portion 420 and may be coupled to the container portion 100. The volume of the bonding portion 430 may be formed toward a packaging sheet facing the bonding portion 430. Due to the volume, the packaging sheets may, instead of coming in close contact with each other, be spaced apart from each other and form the storage space. Various bonding techniques may be applied for coupling the bonding portion 430 to the packaging sheets. For example, various bonding techniques such as chemical bonding using an adhesive, internal-heat bonding (ultrasonic bonding, high-frequency bonding, or the like), and external-heat bonding may be applied.

The container 1000 illustrated in FIGS. 1 to 3 is only illustrative, and various other configurations may be applied according to an embodiment of the present invention.

Figure 4:
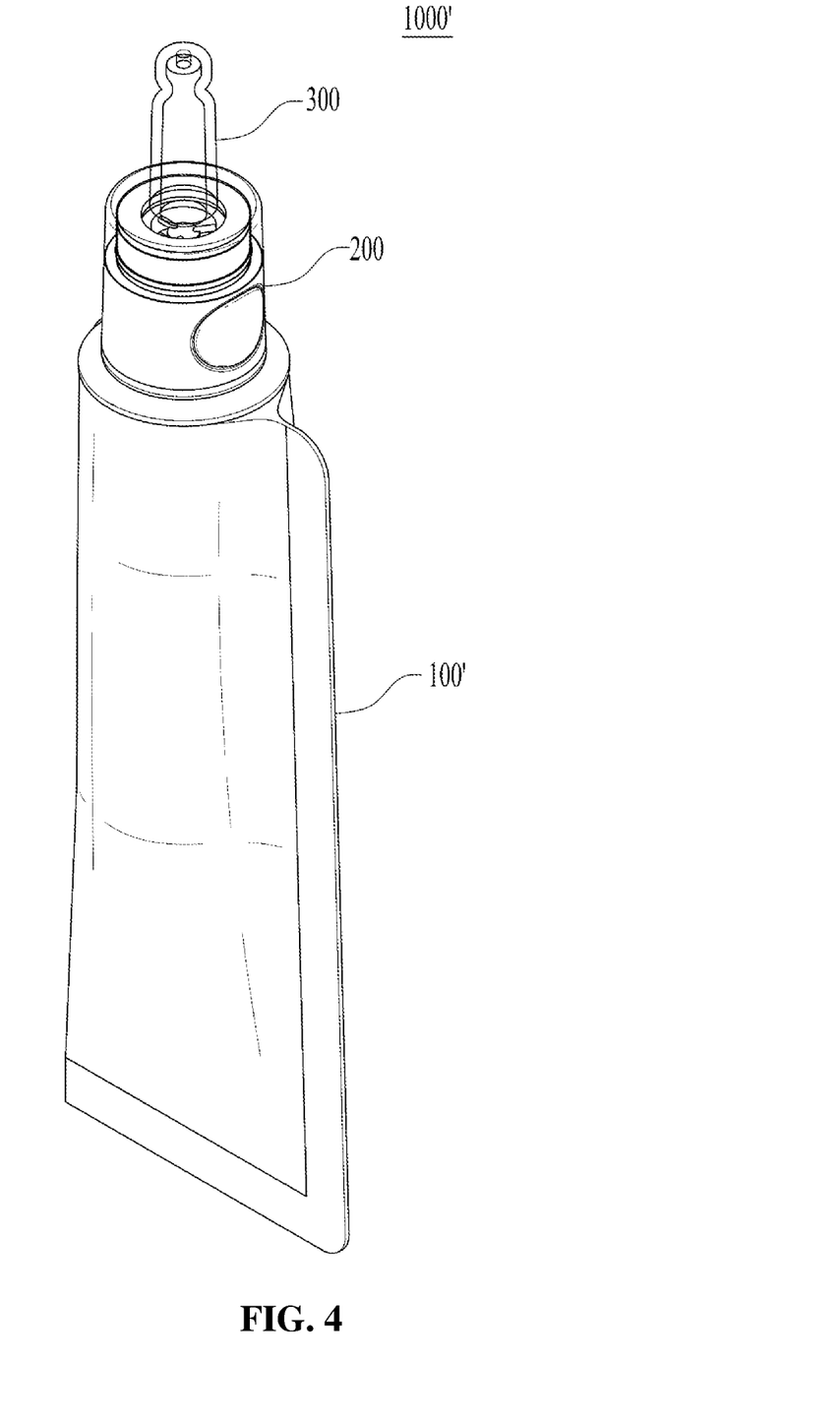
FIG. 4 is a perspective view of a container according to an embodiment of the present invention.

FIG. 4 is a perspective view of a container according to an embodiment of the present invention.

A container 1000' of FIG. 4 will be described below, and description of details which are the same as those relating to the container 1000 of FIGS. 1 to 3 will be omitted.

Referring to FIG. 4, a container portion 100' of the container 1000' may be a pouch which is formed due to bonding of a front packaging sheet and a rear packaging sheet to each other. Here, the front packaging sheet and the rear packaging sheet may be integrally formed and may form a storage space by being combined through bonding in a state in which at least some areas are in contact with each other by folding and/or rolling.

In this case, a sealing portion may be formed at only one side of the container portion 100' in a lateral direction. Since a bonding area is reduced, a bonding process may be simplified. In particular, unnecessary processes such as aligning the separately-formed front packaging sheet and rear packaging sheet with each other and widening a gap therebetween may be eliminated. The container 1000' illustrated in FIG. 4 is only illustrative, and various other configurations may be applied according to an embodiment of the present invention.

Figure 5:
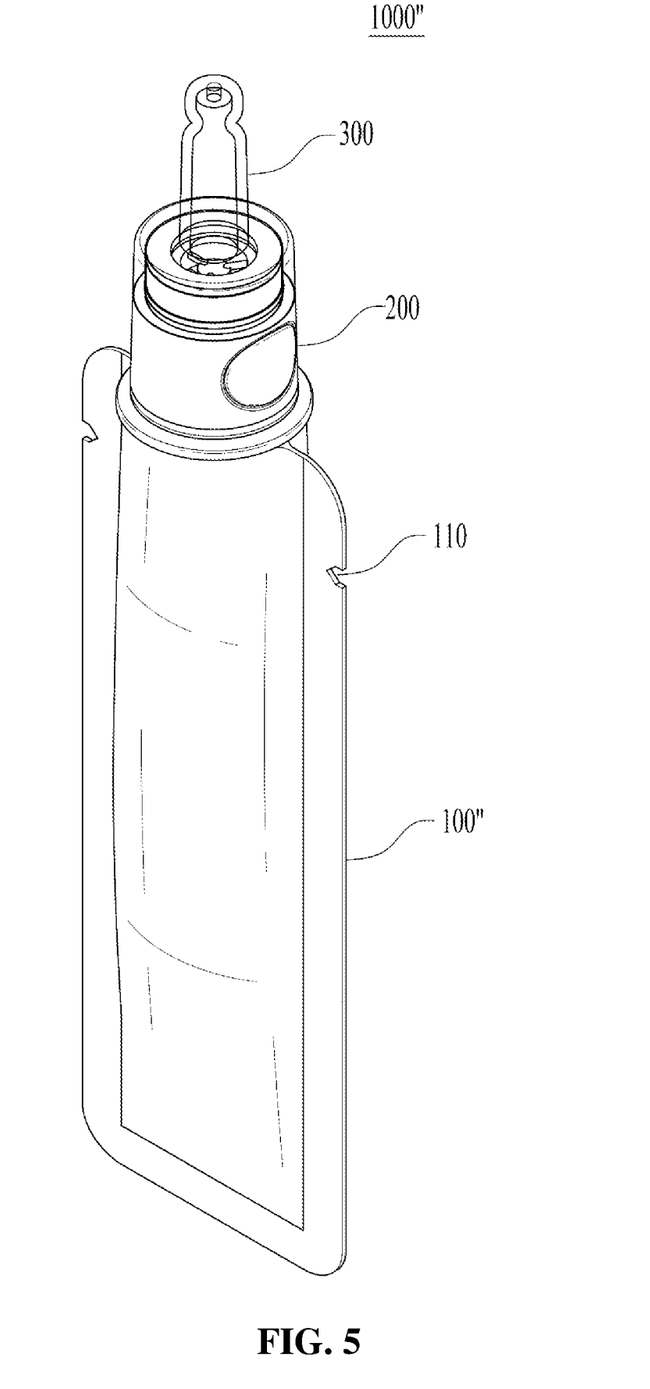
FIG. 5 is a perspective view of a container according to an embodiment of the present invention.
Figure 6:
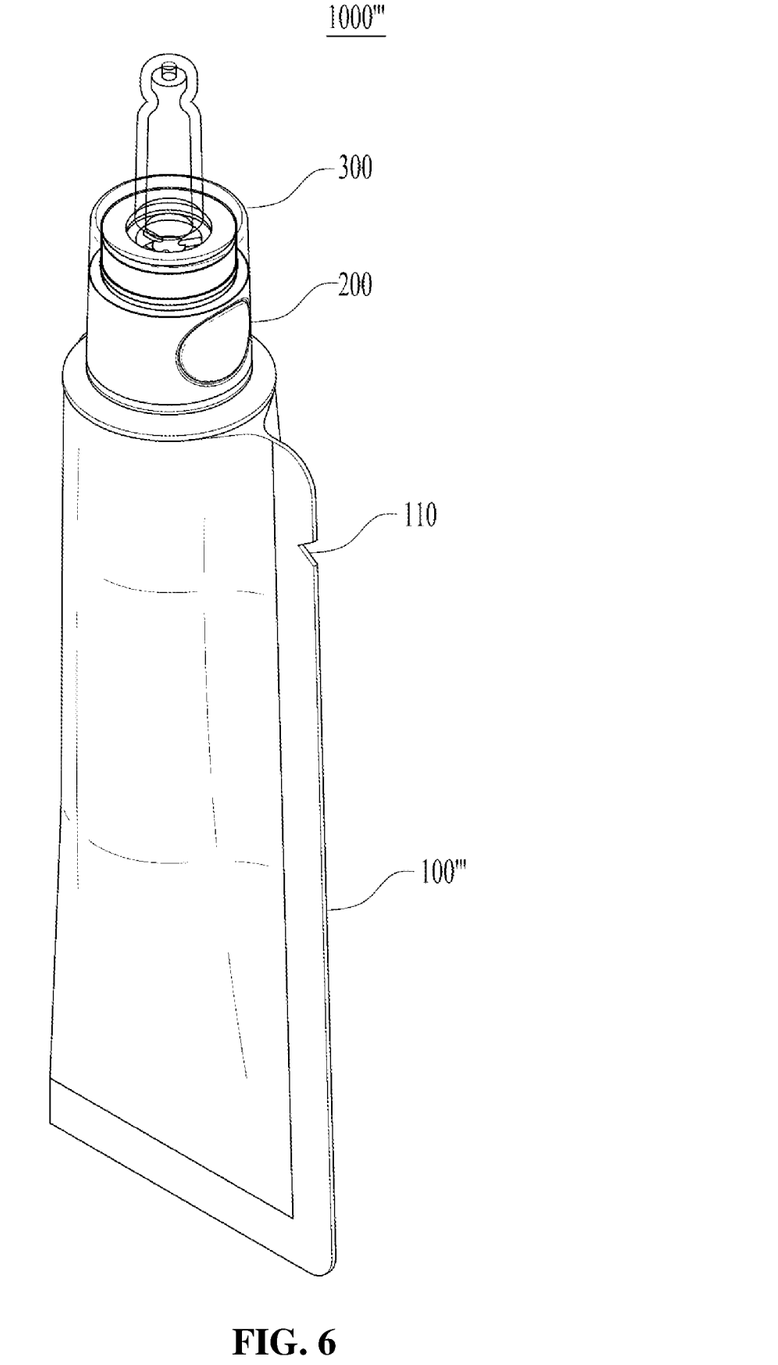
FIG. 6 is a perspective view of a container according to an embodiment of the present invention.

FIGS. 5 and 6 are perspective views of containers according to different embodiments of the present invention.

A container 1000" of FIG. 5 and a container 1000'" of FIG. 6 will be described below, and description of details which are the same as those relating to the container 1000 of FIGS. 1 to 3 and the container 1000' of FIG. 4 will be omitted.

Referring to FIGS. 5 and 6, a tear-off portion 110 may be formed in container portions 100" and 100'". The tear-off portion 110 is for facilitating the tearing of the container portions 100" and 100'" and may be formed as one area of the container portion 100" and one area of the container portion 100'" are drawn inward.

A user may directly use contents in the container portions 100" and 100'" by tearing the container portions 100" and 100'" through the tear-off portion 110. For example, even in a case in which a considerable amount of contents has been used and it is difficult to discharge any more contents through the spout 400, a user may tear the container portions 100" and 100'" to take out and use the contents remaining in the container portions 100" and 100'". Also, through the tear-off portion 110, the container portions 100" and 100'" may be separated from the spout 400 or, from the spout 400 and portions of the container portions 100" and 100'" attached to the spout 400, the residual container portions 100" and 100' may be separated in order to enable recycling of the separated container portions 100" and 100'". To this end, the tear-off portion 110 may be disposed at portions of the container portions 100" and 100'" that are adjacent to a lower side of the spout 400. However, the present invention is not limited thereto.

The tear-off portion 110 may be formed on a sealing portion that is formed along the periphery of the container portions 100" and 100'". Since the tear-off portion 110 is formed in one area of the sealing portion, a case in which the shape of the container portions 100" and 100'" collapses due to the tear-off portion 110 or sealing performance of the container portions 100" and 100'" degrades due to the tear-off portion 110 may be prevented.

The tear-off portion 110 may be formed to become narrower toward the inside. In particular, the innermost side of the tear-off portion 110 may be formed to be angular. This is to facilitate tearing using the tear-off portion 110.

The containers 1000" and 1000'" illustrated in FIGS. 5 and 6 are only illustrative, and various other configurations may be applied according to an embodiment of the present invention.

Figure 7:
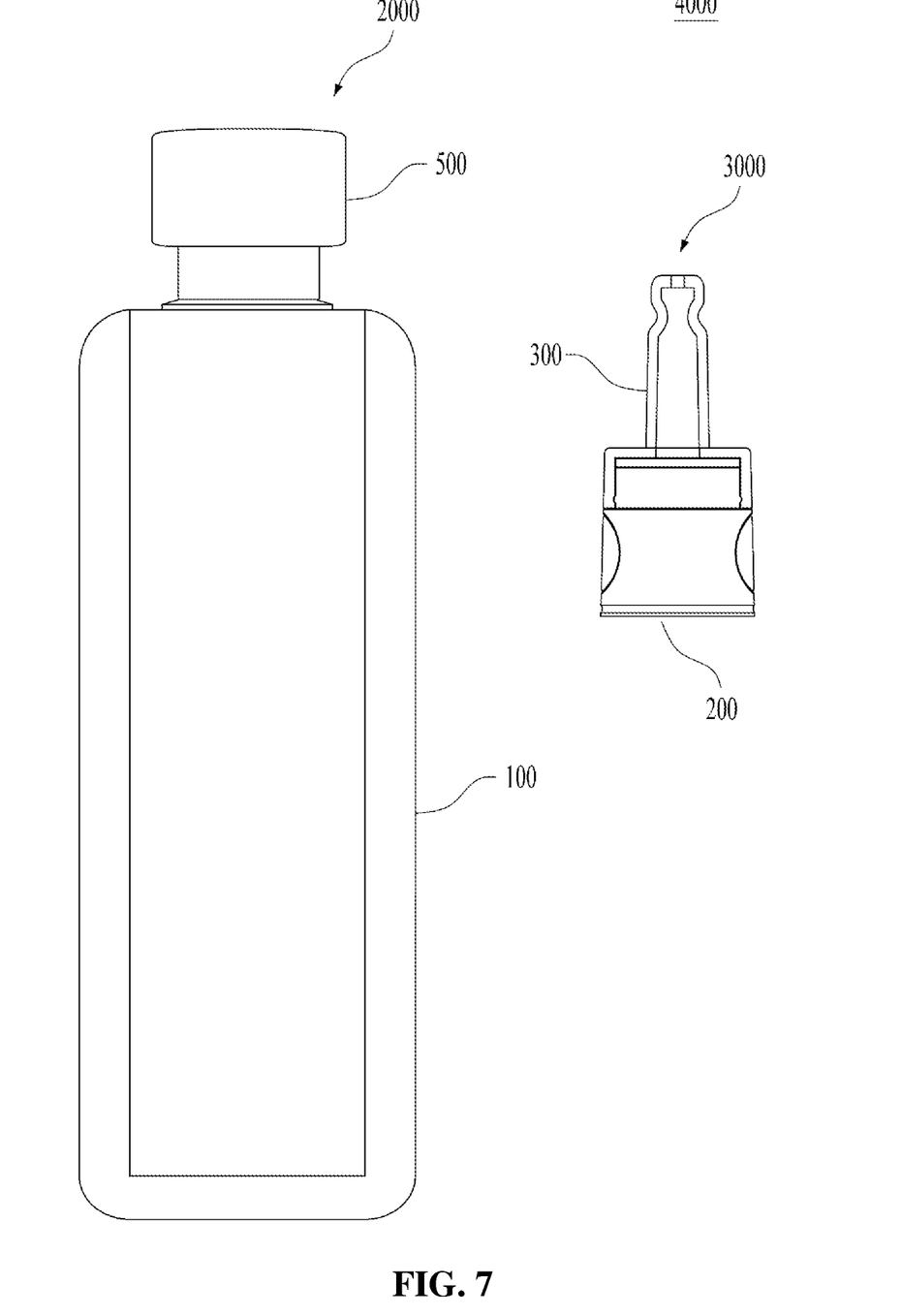
FIG. 7 is a view for describing a container set according to an embodiment of the present invention.
Figure 8:
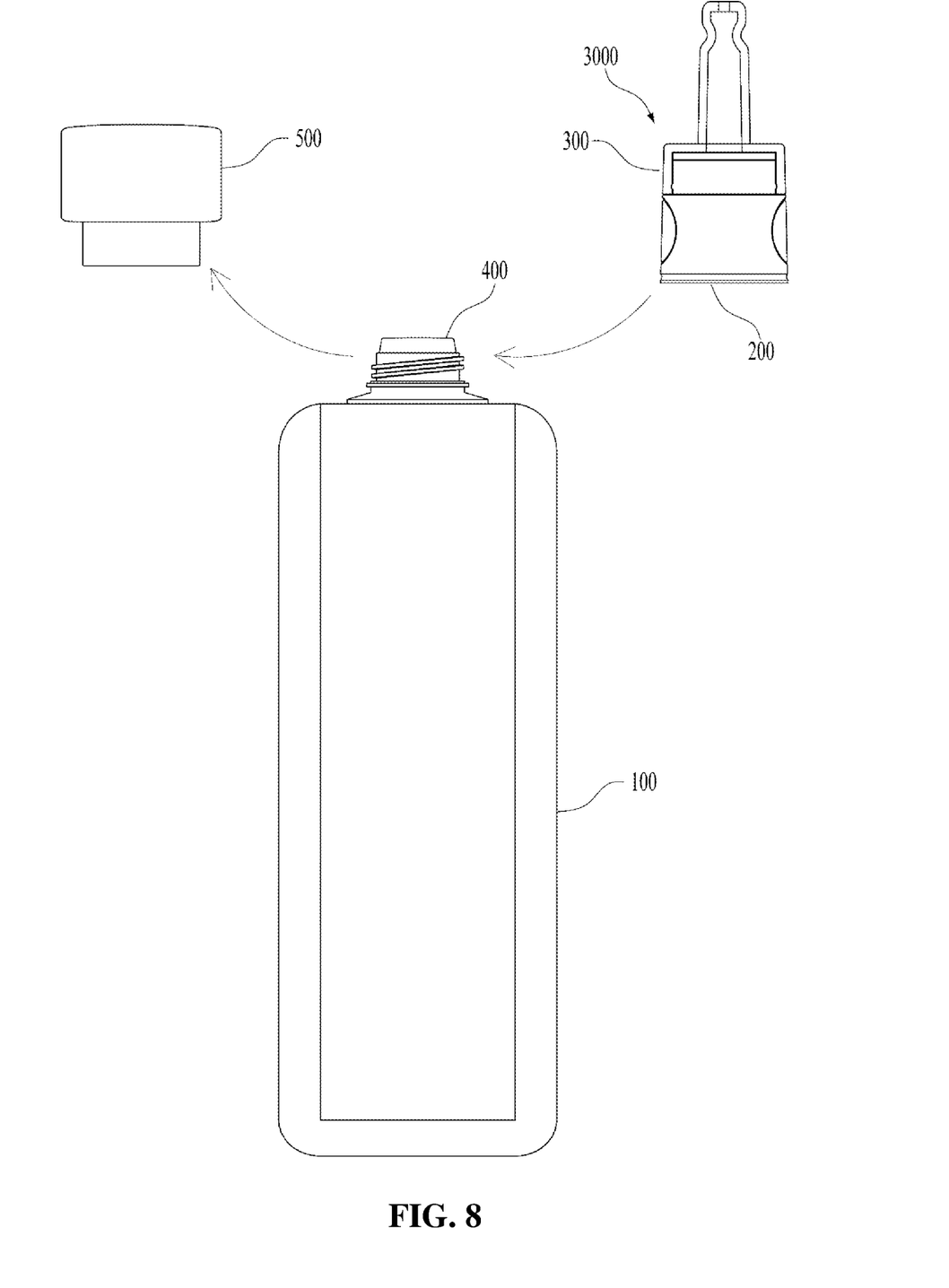
FIG. 8 is a view for describing the container set according to the embodiment of the present invention.

FIGS. 7 and 8 are views for describing a container set according to an embodiment of the present invention.

Referring to FIG. 7, a container set 4000 may include a refill container 2000 and an applicator 3000. Specifically, the refill container 2000 may include the container portion 100, the spout 400, and the stopper 500. Here, the refill container 2000 may be provided as one or more refill containers 2000, and the container portions 100 of the refill containers 2000 may store the same or different contents. The stopper 500 may be detachably coupled to the spout 400 to seal the spout 400. Also, the applicator 3000 may include the head portion 200 and the nozzle 300. Although the container portion 100 is illustrated in FIG. 7, this is only illustrative, and the container portion 100', the container portion 100", the container portion 100''', or other container portions may be included in the refill container 2000.

Referring to FIG. 8, the stopper 500 of the refill container may be removed to expose the spout 400 of the refill container, and then the head portion 200 of the applicator 3000 may be coupled to the spout 400 to form the container 1000 from the container set 4000. To this end, a coupling method (e.g., screw coupling or the like) used to couple the spout 400 and the stopper 500 and a coupling method (e.g., screw coupling or the like) used to couple the spout 400 and the head portion 200 may be the same. In this way, a user may easily replace only the refill container to use contents therein while keeping the applicator 3000.

The container set illustrated in FIGS. 7 and 8 is only illustrative, and various other configurations may be applied according to an embodiment of the present invention.

Figure 9:
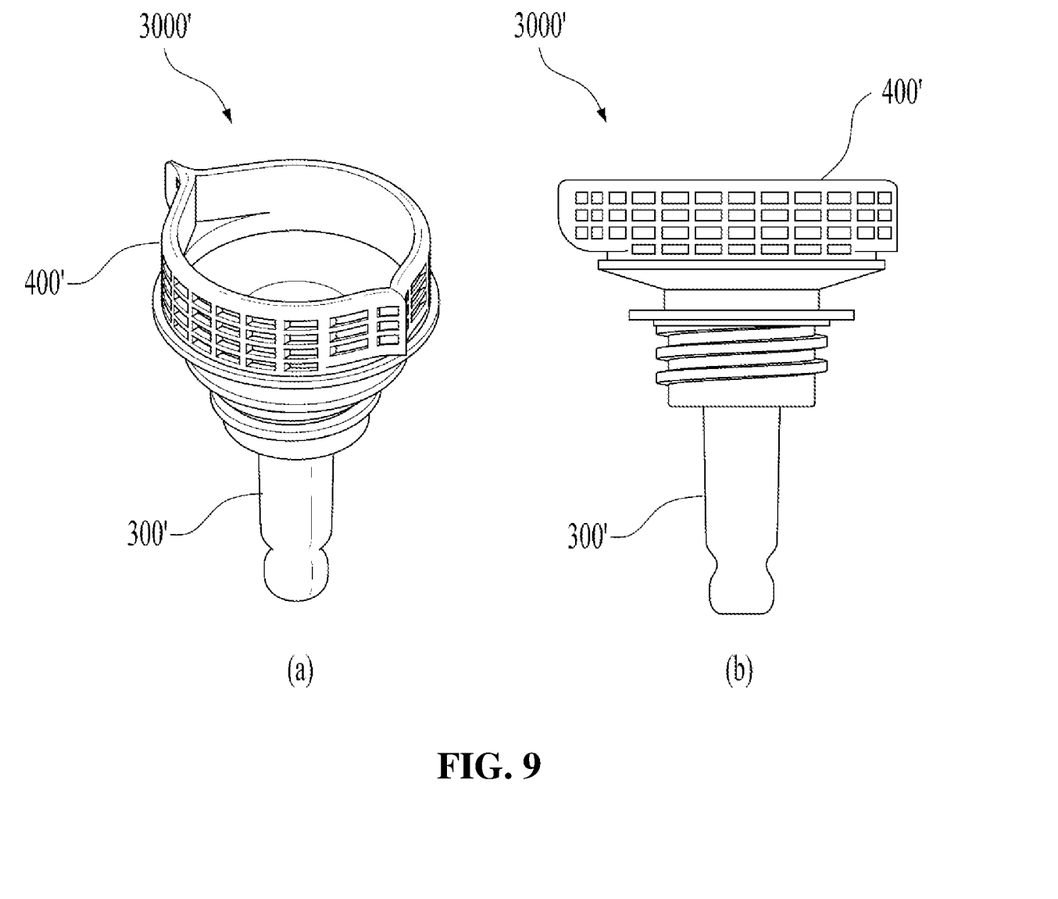
FIG. 9 shows a perspective view and a front view of an applicator according to an embodiment of the present invention.

FIG. 9 shows a perspective view and a front view of an applicator according to an embodiment of the present invention.

Referring to FIG. 9, an applicator 3000' may include a spout 400' and a nozzle 300'. The spout 400' and the nozzle 300' of the applicator 3000' will be described below, and description of details which are the same as those relating to the spout 400 and the nozzle 300 of FIGS. 1 to 8 will be omitted.

In the applicator 3000' of FIG. 9, the spout 400' and the nozzle 300' may be integrally formed. That is, the nozzle 300' may directly extend from the spout 400', and thus an element, such as a nozzle coupling portion, for coupling the nozzle 300' to another element (e.g., a head portion) may be excluded. Likewise, an element such as the head portion may also be excluded, and thus, contents may directly enter the nozzle 300' from a discharge portion of the spout 400' instead of entering from the head portion.

Also, the applicator 3000' may be made of a recyclable material. The applicator 3000' may be separated from the container portion and recycled. For example, the applicator 3000' may be made of a single material such as polypropylene (PP) or polyester (PE) or may be made of a biodegradable material or the like. However, the present invention is not limited thereto.

The applicator 3000' illustrated in FIG. 9 is only illustrative, and various other configurations may be applied according to an embodiment of the present invention.

Figure 10:
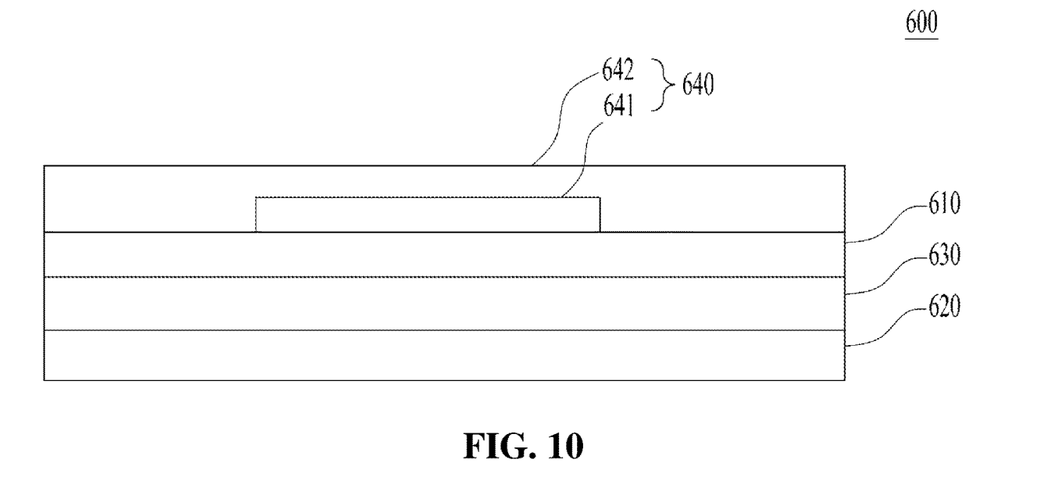
FIG. 10 is a cross-sectional view of a packaging sheet according to an embodiment of the present invention.
Figure 11:
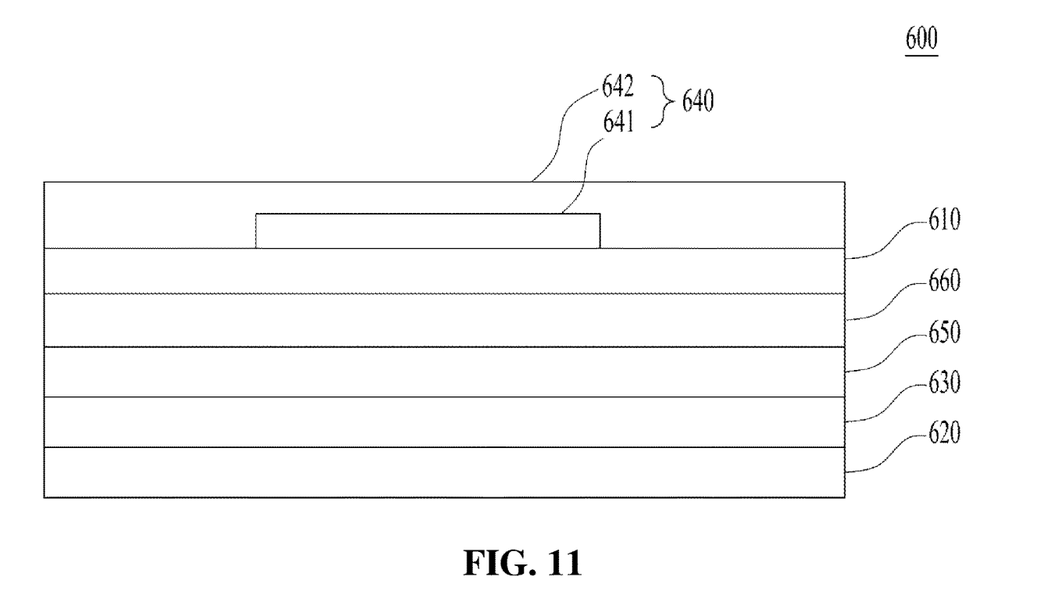
FIG. 11 is a cross-sectional view of a packaging sheet according to an embodiment of the present invention.

FIGS. 10 and 11 are cross-sectional views of a packaging sheet according to embodiments of the present invention.

The packaging sheet may be used in the container portions 100, 100', 100", and 100''' of FIGS. 1 to 8, but the present invention is not limited thereto.

Referring to FIGS. 10 and 11, a packaging sheet 600 may include a paper layer 610, a first film layer 620, a second film layer 630, and a print layer 640.

The paper layer 610 is a base made of paper. For example, the paper layer 610 may be made of chemical wood pulp such as bleached kraft pulp of broad-leaved trees, bleached kraft pulp of needle-leaved trees, and sulfite pulp, mechanical wood pulp such as stone-ground pulp, thermomechanical pulp, and chemi-thermomechanical pulp, deinked pulp (DIP), or non-timber fibers obtained from kenaf, bamboo, hemp, or the like. For example, the paper layer 610 may be made of traditional Korean paper (hanji), parchment, yellow parchment, kraft paper, white paperboard, tissue paper, art paper, Manila paper, ivory paper, medium quality paper, groundwood paper, glassine paper, or tracing paper.

In an embodiment, the paper layer 610 may be compressed. For example, the compression may be performed by applying heat and pressure to the paper layer 610 while passing the paper layer 610 between two rollers. In this way, while surface treatment is performed on the paper layer 610, the paper layer 610 may be compressed. Due to the compression, a density of the paper layer 610 may be increased, and a surface of the paper layer 610 may be evenly formed. In this way, a film layer, the print layer 640, or the like may be uniformly coupled to the paper layer 610, and blocking performance of the paper layer 610 itself may be improved.

In an embodiment, the paper layer 610 may be surface-treated. The surface treatment may be performed by coating the surface of the paper layer 610 with a surface treatment material. Here, the surface treatment material may include starch, a starch derivative, polyvinyl alcohol (PVA), carboxymethyl cellulose (CMC), latex, and the like.

The first film layer 620 may be disposed below the paper layer 610 and may prevent contents inside the container from being absorbed into the paper layer 610 and may block the contents from gas, oxygen, moisture, ultraviolet light, or the like. For example, the first film layer 620 may be made of one or more selected from the group consisting of linear low density polyethylene (LLDPE), low density polyethylene (LDPE), casting polypropylene, polylactic acid, and polybutylene succinate and may effectively prevent the contents from being absorbed into the paper layer 610.

The second film layer 630 may be disposed between the first film layer 620 and the paper layer 610 to improve the overall strength of the packaging sheet 600. Due to the second film layer 630, a problem in which the packaging sheet 600 is damaged due to lack of strength may be effectively addressed. For example, the second film layer 630 may be made of one or more selected from the group consisting of polyethylene terephthalate (PET), glycol-modified polyethylene terephthalate (PETG), post-consumer recycled polyethylene terephthalate (PCR-PET), polyethylene, polypropylene (PP), polyester (PE), polymethyl methacrylate (PMMA), and a styrene-acrylonitrile copolymer (SAN).

In an embodiment, the second film layer 630 may be formed by being deposited on an upper surface of the first film layer 620. Accordingly, the second film layer 630 may be formed in a small uniform thickness on the upper surface of the first film layer 620 and then used together with the first film layer 620. For example, a deposition layer of the present invention may be formed by a known deposition technique such as chemical vapor deposition (CVD) or physical vapor deposition (PVD), or various other known deposition techniques may be applied according to an embodiment.

In an embodiment, the first film layer 620 and the second film layer 630 may be biodegradable. To this end, the first film layer 620 and the second film layer 630 may include at least one of a biodegradable resin and an oxo-biodegradable resin. Here, the biodegradable resin may include both a natural product-based biodegradable resin, which is manufactured by preprocessing biomass, obtaining a sugar through a saccharification process, and polymerizing high molecular monomers produced through a fermentation process, and a petroleum-based biodegradable resin which is manufactured using a petrochemical-derived substance. For example, the biodegradable resin may be selected from the group consisting of polylactic acid (PLA) and a copolymer thereof, polycaprolactone (PCL), polyglycolic acid (PGA), polyether sulfone (PES), polybutylene succinate (PBS), polybutylene succinate adipate (PBSA), cellulose-based compounds, polyhydroxy alkylate (PHA), polybutylene adipate terephthalate (PBAT), polybutylene succinate terephthalate (PBST) resin, and mixtures thereof but is not limited thereto. Also, the oxo-biodegradable resin is manufactured by adding biomass, an oxo-biodegradation agent, a compatibilizer, a biodegradation accelerator, an automatic oxidizing agent, or the like to conventional general-purpose plastics. Examples of the oxo-biodegradable resin may include various types of oxo-biodegradable resins such as an oxo bio-polypropylene (PP)-based oxo-biodegradable resin and an oxo bio-polyethylene (PE)-based oxo-biodegradable resin, but are not limited thereto.

In an embodiment, an adhesive layer 650 may be disposed between the paper layer 610 and the second film layer 630. The adhesive layer 650 is for adhering the second film layer 630 to the paper layer 610. For example, the adhesive layer 650 may be formed by applying an adhesive on the paper layer 610 and/or the second film layer 630 and then compressing the paper layer 610 and the second film layer 630. Since the paper layer 610 is compressed to high density by the compression and has high moisture blocking performance, the adhesive may form a single layer between the paper layer 610 and the second film layer 630, and the adhesive may show uniform and improved adhesive performance throughout the entire adhesive area.

In an embodiment, the adhesive layer 650 may be formed of a water-degradable adhesive. Accordingly, water degradation of the adhesive layer 650 may allow the second film layer 630 and the paper layer 610 to be easily separated from each other. To this end, the adhesive may be an emulsion-type water-based adhesive in which an adhesive is dispersed in water. For example, the adhesive may be a water-based urethane adhesive. However, the present invention is not limited thereto, and various other natural water-based adhesives (e.g., starch, protein, animal glue, casein, natural rubber, latex, and the like) and synthetic water-based adhesives (e.g., a water-based acrylic adhesive or the like) may be used as the adhesive.

In an embodiment, the adhesive layer 650 may be made of a biodegradable material like the paper layer 610 and the second film layer 630. For example, the adhesive layer 650 may be made of a biodegradable resin or an oxo-biodegradable resin.

According to an embodiment, the second film layer 630 may be directly bonded to the paper layer 610. In bonding of the second film layer 630 and the paper layer 610, various bonding techniques such as internal-heat bonding (ultrasonic bonding, high-frequency bonding, or the like) and external-heat bonding may be applied. For example, a heating plate may be compressed to an outer portion of the second film layer 630 to conduct heat thereto, and in this way, the melted second film layer 630 may be adhered to the paper layer 610.

The print layer 640 is formed by printing on an upper side of the paper layer 610 and may include a first print layer 641 and a second print layer 642.

Here, the first print layer 641 may be formed by applying water-based ink on an upper surface of the paper layer 610. The first print layer 641 may form a predetermined shape, letter, drawing, or color on the surface of the paper layer 610. Here, the water-based ink may be eco-friendly ink that contains water at 90 wt % or more. Examples of the water-based ink may include polyurethane ink, acrylic ink, or the like.

The second print layer 642 may be formed by, in a state in which the first print layer 641 is formed, overprinting a water-based coating solution (e.g., a water-based acrylic coating solution or the like) on upper surfaces of the first print layer 641 and the paper layer 610. The water-based coating solution is overprinted throughout the entire surface of the paper layer 610, and the second print layer 642 formed due to the water-based coating solution may protect the first print layer 641 and the paper layer 610, which are disposed below the second print layer 642, from damage due to external impacts. The second print layer 642 may be transparent so that the first print layer 641 below the second print layer 642 is visible from the outside.

In an embodiment, since the paper layer 610 is compressed to high density and has high moisture blocking performance, the water-based ink and water-based coating solution may not be absorbed into the paper layer 610 or only a very small amount of the water-based ink and water-based coating solution may be absorbed into the paper layer 610, and the remaining water-based ink and remaining water-based coating solution may form the first print layer 641 and the second print layer 642, respectively.

According to an embodiment, both the water-based ink forming the first print layer 641 and the water-based coating solution forming the second print layer 642 may be water-degradable. Accordingly, the print layer 640 may be separated from the paper layer 610 through water degradation.

In an embodiment, a thin film layer (not illustrated) may be formed on an upper side of the paper layer 610. For example, the thin film layer may be formed by hot-stamping a hot-stamping foil on upper surfaces of the paper layer 610, the first print layer 641, and/or the second print layer 642. The thin film layer may give a metallic texture to the packaging sheet 600 and thus maximize the aesthetic appearance thereof.

In an embodiment, the packaging sheet 600 may further include a water-based blocking layer 660. The water-based blocking layer 660 may be formed by applying a water-based blocking solution on at least one surface of the paper layer 610. Since the paper layer 610 is compressed to high density by the compression and has high moisture blocking performance, even when the water-based blocking solution is applied on the paper layer 610, the water-based blocking solution may not be absorbed into the paper layer 610 or only a very small amount of the water-based blocking solution may be absorbed into the paper layer 610, and the remaining water-based blocking solution may form a single layer on the surface of the paper layer 610. The water-based blocking layer 660 may be disposed between the paper layer 610 and the print layer 640 and/or disposed between the paper layer 610 and the adhesive layer 650. That is, by allowing the blocking layer 660 to form a single layer along the paper layer 610 instead of being absorbed into the paper layer 610, the blocking layer 660 may provide more uniform and improved moisture and gas blocking performance. The water-based blocking solution may include a high molecular polymer that does not include a hydrophilic group. For example, the water-based blocking solution may include a vinyl chloride polymer, an ethylene vinyl alcohol polymer, a styrene-butadiene-based polymer, a styrene-acrylic-based polymer, a polyvinyl alcohol polymer, a vinylidene chloride polymer, and the like, but is not limited thereto.

Exemplary embodiments have been disclosed herein and in the drawings. Although specific terms have been used herein, the terms are only used for the purpose of describing the present invention and are not intended to limit meanings or limit the scope of the present invention described in the claims below. Therefore, those of ordinary skill in the art should understand that various modifications and other equivalent embodiments are possible. Accordingly, the actual technical scope of the present invention should be defined by the technical idea of the attached claims.

The invention claimed is:

1. A packaging sheet for storing contents, the packaging sheet comprising:
   a paper layer;
   a first film layer disposed at a first side of the paper layer, the first film layer configured to prevent absorption of the contents into the paper layer;
   a second film layer interposed between the paper layer and the first film layer, the second film layer configured to improve a strength of the packaging sheet; and
   an adhesive layer interposed between the second film layer and the paper layer and configured to adhere the second film layer and the paper layer to each other,
   wherein the adhesive layer has a water-degradable adhesive, and
   wherein the paper layer is configured to separate from the first film layer and the second film layer due to water degradation of the adhesive layer.

2. The packaging sheet of claim 1, wherein peripheries of one or more of the packaging sheet are bonded to define a pouch.

3. The packaging sheet of claim 1, wherein the second film layer is deposited on one surface of the first film layer.

4. The packaging sheet of claim 1, wherein the paper layer is compressed.

5. The packaging sheet of claim 1, further comprising:
   a first print layer formed by applying a water-based ink disposed on a second side of the paper layer; and
   a second print layer formed by overprinting a water-based coating solution disposed on a first side of the first print layer and the second side of the paper layer,
   wherein the first print layer and the second print layer are configured to separate from the paper layer due to water degradation.

6. The packaging sheet of claim 1, wherein the first film layer of includes at least one of a low density polyethylene film, a linear low density polyethylene film, a casting polypropylene film, a polylactic acid film, and a polybutylene succinate film.

7. The packaging sheet of claim 1, wherein the second film layer of includes at least one of polyethylene terephthalate (PET), glycol-modified polyethylene terephthalate (PETG), post-consumer recycled polyethylene terephthalate (PCR-PET), polyethylene, polypropylene (PP), polyester (PE), polymethyl methacrylate (PMMA), and styrene-acrylonitrile copolymer (SAN).

8. The packaging sheet of claim 1, further comprising a water-based blocking layer formed by applying a water-based blocking solution disposed on the paper layer,
   wherein the water-based blocking solution includes at least one of a vinyl chloride polymer, an ethylene vinyl alcohol polymer, a styrene-butadiene-based polymer, a styrene-acrylic-based polymer, a polyvinyl alcohol polymer, and a vinylidene chloride polymer.

9. A container comprising:
   a container portion made of a packaging sheet and configured to store contents; and
   a spout coupled to the container portion and configured to discharge the contents in the container portion through the spout,
   wherein the packaging sheet comprises:
     a paper layer;
     a first film layer disposed at a Mowed first side of the paper layer and configured to prevent absorption of the contents into the paper layer;
     a second film layer interposed between the paper layer and the first film layer and configured to improve a strength of the packaging sheet; and
     an adhesive layer interposed between the second film layer and the paper layer and configured to adhere the second film layer and the paper layer to each other,
       wherein the adhesive layer has a water-degradable adhesive, and
       wherein the paper layer is configured to separate from the first film layer and the second film layer due to water degradation of the adhesive layer.

10. The container of claim 9, further comprising a nozzle integrally defined with the spout and configured to discharge the contents that enter the nozzle from the spout.

11. The container of claim 9, wherein the container portion is a pouch defined by bonded peripheries of one or more of the packaging sheet.

12. The container of claim 11, wherein a tear-off portion is disposed in a periphery of the container portion and one area of the tear-off portion is drawn inward, and at least a portion of the container portion is configured to separate from the spout by tearing off the container portion along the tear-off portion.

13. The container of claim 10, wherein the nozzle comprises:
   a nozzle tube;
   a nozzle throat continuous with the nozzle tube, the nozzle throat having:
     a convergent section having a first inner diameter that gradually decreases by a predetermined amount and
     a divergent section continuous with the convergent section, the divergent section having a second inner diameter that gradually increases by a predetermined amount,
       wherein the convergent section and the divergent section are configured to decrease a flow velocity of the contents.

14. The container of claim 13, wherein the nozzle further comprises:
   a nozzle head configured to surround the contents;
   an outlet disposed at the nozzle head,
     wherein an inner diameter of the outlet is narrower than the first and second inner diameters.

* * * * *